Oct. 20, 1953        H. G. FAY        2,655,692
MOLD FOR FRAMING LENSES IN A PLASTIC MOUNTING
Filed April 1, 1952
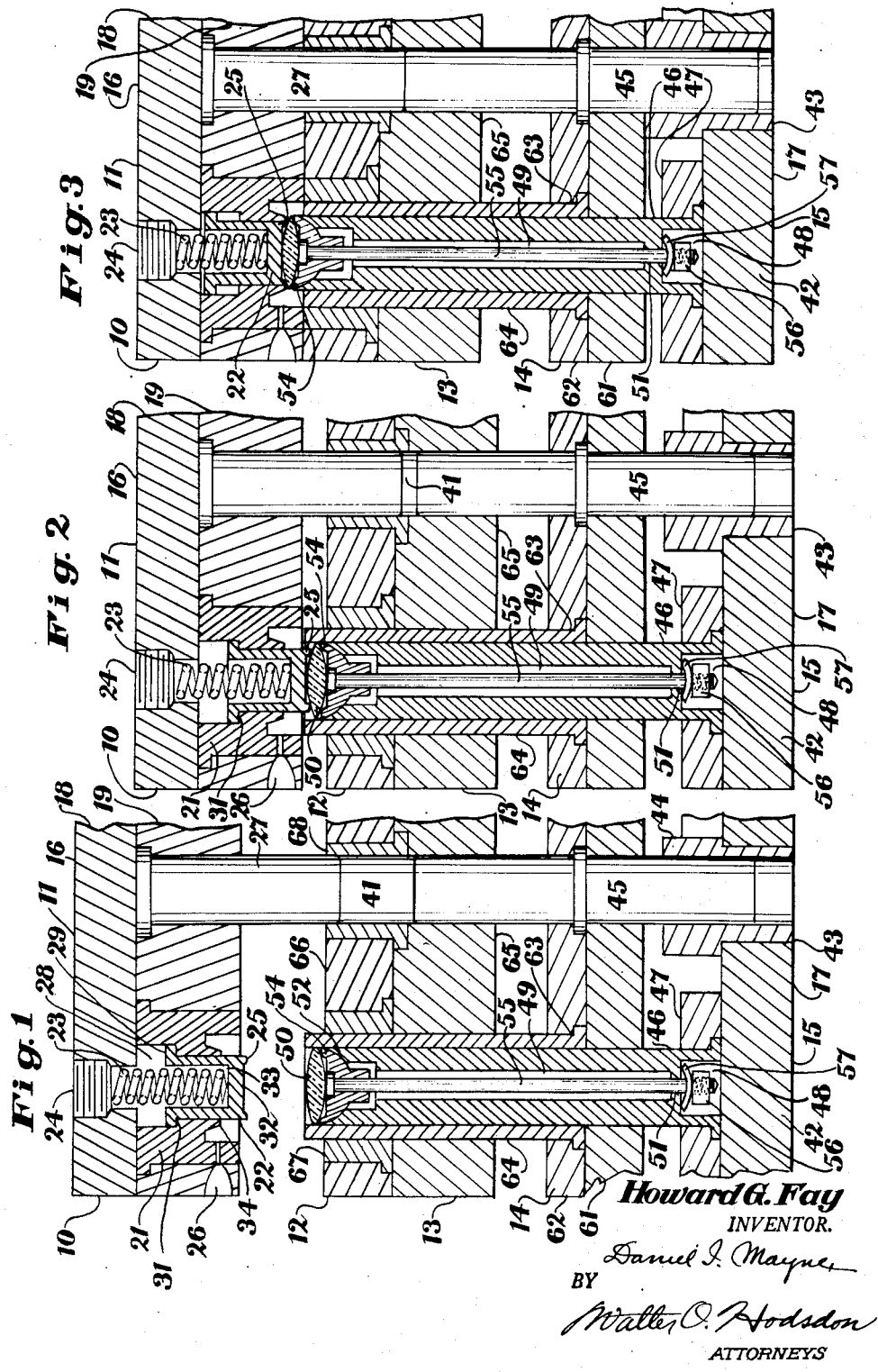
Howard G. Fay
INVENTOR.
BY
ATTORNEYS Patented Oct. 20, 1953

2,655,692

UNITED STATES PATENT OFFICE 2,655,692

MOLD FOR FRAMING LENSES IN A PLASTIC MOUNTING

Howard G. Fay, Rochester, N. Y., assignor to Eastman Kodak Company, Rochester, N. Y., a corporation of New Jersey Application April 1, 1952, Serial No. 279,902

2 Claims. (Cl. 18—36)

This invention relates to a mold for framing lenses in a plastic mounting, and more particularly to a novel injection mold structure adaptable to mold around the edge of a non-optically centered lens a frame of thermoplastic material which will be approximately concentric with the periphery of the lens.

Heretofore, as described and claimed, for example, in my Patents 2,559,860 and 2,559,861 of July 10, 1951, injection molds adapted to automatically optically center an uncentered lens and to mold a thermoplastic frame around the edge of the thus optically centered lens have been provided. In some applications, however, such as the framing of simple magnifiers it is not necessary to optically center the magnifying lens although it is desirable to mold a supporting frame around the edge of the lens substantially concentric with its periphery and irrespective of variance in the thickness of the lens adjacent its periphery.

An object, therefore, of the present invention is to provide an injection mold structure which is adaptable to mold around the edge of a non-optically centered lens a plastic frame concentric with the periphery of the lens and irrespective of variance in the thickness of the lens adjacent its periphery.

Other objects and advantages of the present invention will be more fully understood from the following description when read in connection with the accompanying drawing in which:

Fig. 1 is an elevational view partly in section of one embodiment of the injection mold of the invention showing the mold partly open and a lens positioned therein;

Fig. 2 is a somewhat similar view of the mold in which the mold is partially closed and the lens is held between clamping members; and Fig. 3 is a view corresponding in detail to Figs. 1 and 2, showing the mold completely closed and the lens in the position at which the thermoplastic composition will be injected therearound to form the frame.

Similar parts are identified by the same numerals in these drawings.

Referring to Fig. 1 there is shown an injection mold 10 comprising an upper mold block 11 and a lower mold block 12 which is made in three main parts and comprises cooperating mold members 13, 14 and 15. Component parts of both mold blocks 11 and 12 will be described hereinafter. The upper and lower mold blocks 11 and 12 are movable toward and away from each other for the purpose of opening and closing the mold cavity by a force provided, for example, by the usual hydraulic pistons of an injection molding machine, not shown. The hydraulic pistons would contact respectively surfaces 16 and 17 of the upper and lower mold blocks.

The upper mold block 11 comprises associated mold parts 18, 19, 21, 22, 23, 24, 25 and 27. Numeral 26 represents the gate through which thermoplastic composition may be injected by an injection molding machine, not shown. Members 18, 19, 21 and 27 are associated together and move in a vertical direction as a unit. Member 21, in effect, defines a cylinder 28 in which member 22 is permitted to move in a vertical direction. Member 22 is free to move downwardly until its shoulder 29 engages shoulder 31 of member 22. When the mold is open as in Fig. 1, member 22 is thrust downwardly to the position shown in Fig. 1 by spring 23 which is mounted in an aperture 33 in member 22. The spring 23 exerts its force between member 22 and a plug 24 which is mounted on a tapped hole in mold member 18.

The lower face 32 of member 22 has an integral ring 25 thereon which contacts lens 50 when the mold is closed and serves as the upper clamping member and also defines with projection 34 of member 21 the upper portion of the inner wall of the mold cavity. Mold member guiding post 27 moves into and out of cylinder 41 of the lower mold block 12.

The lower mold block 12, as stated previously, comprises three main coacting members 13, 14 and 15. Member 15 comprises a metal block 42 having an aperture 43 therein in which a hollow bearing member 44 is positioned. The lower end of guiding post 45 is positioned in bearing member 44 which is slidable thereover. Mounted on member 42 is a hollow cylindrical member 46 which extends upwards thereof. A metal plate 47 is also mounted on member 42. The cylindrical member 46 is provided with a countersunk aperture 48 and another cylindrical aperture 49 of less diameter than aperture 48 extends upward through cylinder 46 but is in communication with aperture 48 through hole 51. The opposite end of cylinder member 46 is flared out into a cuplike depression 52 which is in communication with cylindrical aperture 49. A lens supporting member 54 is positioned in the cuplike space 52 and is held in position by rod 55 which extends through hole 51 and cylindrical aperture 49 and is fastened at its lower end by nut 56 and spring 57 which presses against the countersunk wall of cylinder 46. The operation of this lower lens supporting member 54 will be described hereinafter.

It will be seen that cylinder 46 extends through both lower mold members 13 and 14. Mold member 14 is the stationary position of the mold and comprises a lower metal plate 61 and an upper metal plate 62. A cylindrical sleeve 64 is vertically mounted on plate 61. Cylindrical member 46 slidably engages mold member 14 through aperture 63 and also passes through and slidably engages stationary sleeve 64. Guide post 45 is fixedly held in mold member 14 and extends on either side thereof. As previously mentioned, the lower extension of post 45 engages bearing 44 of mold member 15. The upper portion of post 45 extends into aperture 41 of mold member 12.

Mold member 13 comprises a lower metal plate 65 attached to an upper plate 66 in which bearing members 67 and 68 are positioned. Mold member 13 slidably engages stationary sleeve 64 and posts 27 and 45, and is movable up or down in a vertical direction.

The operation of my novel injection mold for framing lenses will now be further described: Mold blocks 11 and 15 would be suitably attached to the respective faces of pistons of an injection molding machine which are adapted to open and close injection molds and would be moved so that the mold parts would assume the positions, for example, as shown in Fig. 1, and sufficiently so that lens 50, which itself may be made of a plastic or glass, could be placed on lower lens support 54. In the operation of this mold, it is desirable that the diameter of the lens 50 be substantially that of the inner diameter of sleeve 64. This prevents horizontal movement of the lens 50 which is not desired in this type of molding operation.

With the lens 50 thus positioned on member 54 the injection molding machine would be actuated to cause the mold to close in the sequence shown in Figs. 2 and 3. As shown in Fig. 2, the upper mold block 11 is lowered until the ring 25 presses against the surface of lens 50 thereby preventing the lens 50 from being forced out of the sleeve 64 during preliminary mold movement. Assuming lens 50 is thicker along one portion of its edge than other portions, a novel effect is produced as the mold closes. The downward force of ring 25 will be exerted on lens 50 which is supported on rockable member 54, which will rock until the lens assumes a flat position in respect to ring 25. This permits a uniform contact on the lens of ring 25 and rockable member 54 and prevents the plastic which is injected into the mold from flowing over the center portion of the lens. The rod 55 which is attached to rockable member 54 will consequently bend somewhat out of its normal position. Rod 55 also functions to hold rockable member 54 from falling out of the mold during mold opening and closing. Next, lower mold part 15 is moved upwardly as shown in Fig. 3, thereby raising the upper end of cylinder 46 and its associated lens supporting member 54 out of the open end of sleeve 64. This upward movement of cylinder 46 is resisted by the spring pressed ring member 22 but, however, this spring pressure is overcome somewhat and member 22 withdraws to the position shown in Fig. 3. As previously stated, the inner walls of the mold cavity will comprise the surface of lower lens supporting member 54 on the lower side of the lens and the cooperating projection 34 and ring 25 on the upper side of the lens. The other walls of the mold cavity, which is formed on closing of the mold, are evident in Fig. 3. The posts 27 and 45 slidably engage the respective mold blocks and maintain them in proper alignment relation as is evident from the drawings. When the mold is closed, as shown in Fig. 3, and held closed under satisfactory pressure, the injection molding machine, not shown, injects thermoplastic material into the mold cavity through gate 26 until the mold cavity is filled. After the plastic is hardened, as is customary by cooling, the pistons are retracted and the mold block assumes the position shown in Fig. 1 and the lens in its frame is removed from the mold cavity. The operation can now be repeated.

While only a single cavity mold has been described, it is obvious that a multiple cavity mold could be assembled which would incorporate my novel mold structure as respects one or more mold cavities. In such a multiple cavity mold, the gate members may be placed in other locations if desired.

Various plastic compounds may be employed to form the lens mounting such as thermoplastic or thermosetting resins. Cellulose ester compositions such as cellulose acetate may be employed advantageously as can the various glass-like acrylate and methacrylate resins.

What I claim and desire to secure by Letters Patent of the United States is:

1. In an injection mold adapted to open and close and to form an injection mold cavity when closed, and to mold a concentric peripheral plastic mounting on a non-optically centered lens positioned in said cavity, the combination of an upper mold block having a vertically slidable and spring mounted lens clamping member with a lower mold block having a vertically slidable lens clamping member mounted to rock about a point on its vertical axis and a stationary hollow cylindrical member through which the lower rockable lens clamping member slides adapted to restrict horizontal movement of a lens placed on said rockable lens clamping member during the initial clamping operation.

2. In an injection mold adapted to open and close and to form an injection mold cavity when closed, and to mold a concentric peripheral plastic mounting on a non-optically centered lens positioned in the cavity, the combination of an upper mold block having a vertically slidable and spring pressed lens clamping member with a lower mold block having a vertically slidable lens clamping member mounted to rock about a point on its vertical axis, and a stationary hollow cylindrical member through which said lens clamping member slides adapted to restrict horizontal movement of a lens placed on said lens clamp during initial clamping movement and adapted to form a portion of the mold cavity wall after complete movement of the coacting lens clamps.

HOWARD G. FAY.

References Cited in the file of this patent

UNITED STATES PATENTS

| Number | Name | Date |
|--------|------|------|
| 2,193,787 | Berry | Mar. 19, 1940 |
| 2,193,935 | Mulcahy | Mar. 19, 1940 |